United States Patent [19]
Condon et al.

[11] 3,987,679
[45] Oct. 26, 1976

[54] VALVE ACTUATING MECHANISM

[75] Inventors: James A. Condon, Gaston; G. Bruce Brenneman, Muncie, both of Ind.

[73] Assignee: Maxon Corporation, Muncie, Ind.

[22] Filed: Oct. 14, 1975

[21] Appl. No.: 621,643

[52] U.S. Cl. .................................. 74/2; 74/522; 251/69
[51] Int. Cl.² .................. G05G 17/00; G05G 1/04; F16K 31/524
[58] Field of Search .................. 74/2, 522; 251/69

[56] References Cited
UNITED STATES PATENTS

| 2,301,876 | 11/1942 | Hurlburt | 251/69 |
| 3,082,627 | 3/1963 | Yeo et al. | 74/2 |
| 3,508,446 | 4/1970 | Yeo et al. | 74/2 |

*Primary Examiner*—Allan D. Herrmann
*Attorney, Agent, or Firm*—Hume, Clement, Brinks, Willian, Olds & Cook, Ltd.

[57] ABSTRACT

In a safety valve actuating mechanism there is included a valve operating means, a biasing means, a lever means, a support means, a cam follower means, a first cam member and a second cam member. The valve operating means is movable between a first position and a second position while being biased toward the second position by the biasing means. The lever means is operably connected to the valve operating means and movable at least between a first fulcrum point and a second fulcrum point. The support means releasably supports the lever means at the first fulcrum point. The first and second cam members are spaced adjacent to the cam follower means which is operably connected to the lever means. The first and second cam members and the cam follower means are adapted to control the movement of the valve operating means with the lever means positioned at either the first fulcrum point or the second fulcrum point.

6 Claims, 10 Drawing Figures

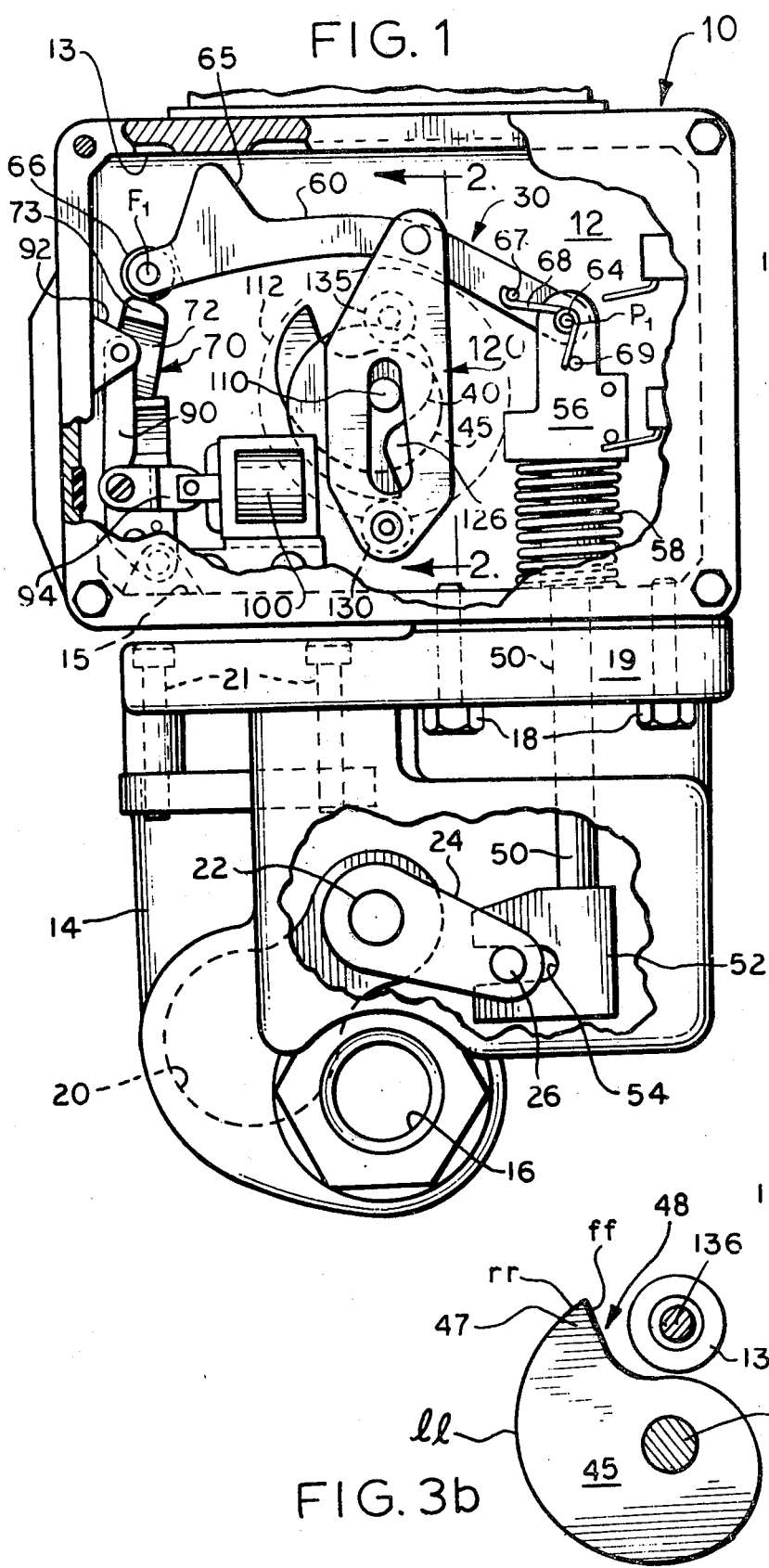
FIG. 1
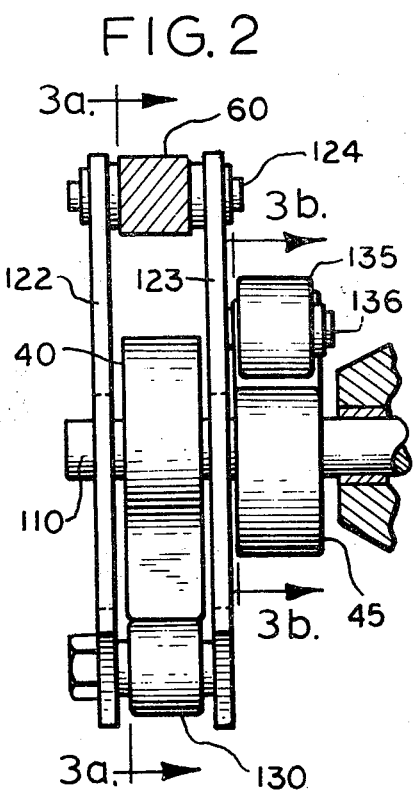
FIG. 2
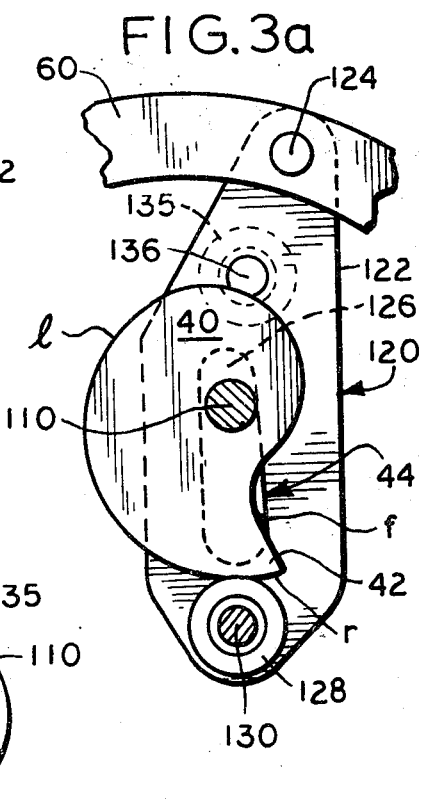
FIG. 3a
FIG. 3b

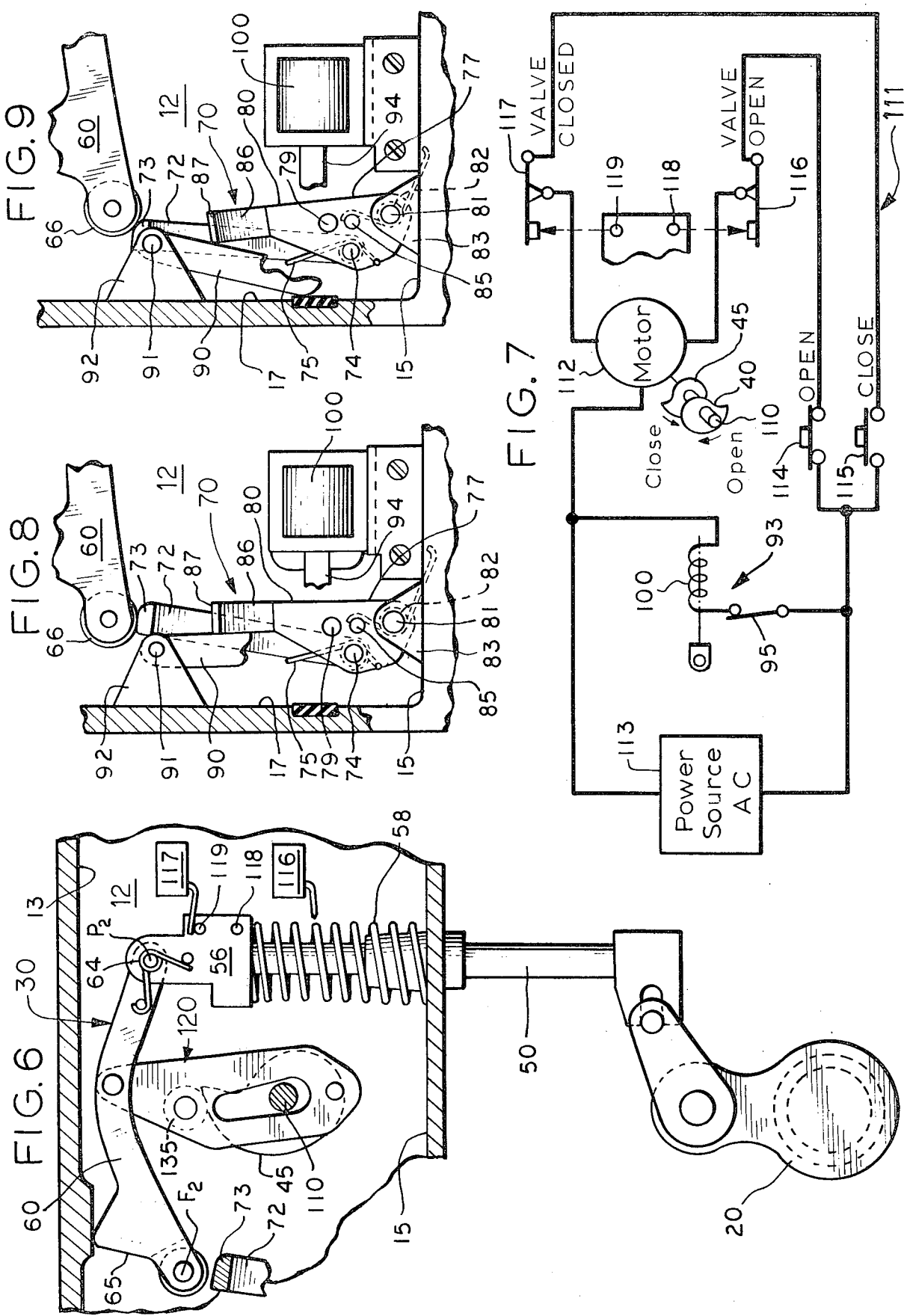

VALVE ACTUATING MECHANISM

BACKGROUND AND GENERAL DESCRIPTION

The present application is an improvement of a valve actuating mechanism described and claimed in U.S. Pat. No. 3,508,446, assigned to the same assignee as the present application.

This invention relates to a safety valve apparatus, and more particularly, to an improved valve actuating mechanism for use in a safety valve apparatus.

Previously known valve actuating mechanisms for use in safety valve apparatus have provided means for closing safety valves under an emergency condition, thereby shutting off a flow of fluid. Such valve actuating mechanisms have been useful in fluid systems wherein the fluid is under high pressure as well as under low pressure. In a fluid system where the fluid flows under high pressure, emergency closure of the safety valves, thereby stopping the flow of fluid, often causes a pressure shock in the fluid system. The resultant effect from the pressure shock is damage to other equipment connected in the fluid system, such as gauges, pressure regulators, and control devices. Aversion of pressure shock in the fluid systems during periods of normal closure of the safety valves is a necessary requirement to enable fluid systems to function properly without constant repair.

It is therefore an object of the present invention to provide a valve actuating mechanism which opens and closes a safety valve under normal operating conditions for use in compressible and incompressible fluid systems.

It is another object of the present invention to provide a valve actuating mechanism which opens and closes a safety valve under normal operating conditions while maintaining the capability of a safety valve to move from an open position to a closed position in response to an emergency signal.

It is still another object of the present invention to provide a valve actuating mechanism which opens and closes a safety valve under normal operating conditions for use in compressible or incompressible fluid systems at high pressure with minimum fluid pressure shock, while maintaining the capability of a safety valve to move from an open position to a closed position in response to an emergency signal.

It is another object of the present invention to provide a valve actuating mechanism that is capable of use in compressible or incompressible fluid systems, including high pressure fluid systems, whereby the movement of the valve actuating mechanism which opens and closes a safety valve is controlled by a reversible motor means.

SUMMARY OF THE INVENTION

According to the present invention there is provided an improved safety valve actuating mechanism for opening and closing a safety valve under normal operating conditions with minimum pressure shock in a fluid system. The safety valve actuating mechanism includes a valve operating means which is movable between a first position wherein the safety valve is open and a second position wherein the safety valve is closed. Biasing the valve operating means toward the second position is a biasing means. Operably connected to the valve operating means is a lever means which is movable at least between a first fulcrum point and a second fulcrum point. Releasably supporting the lever means at the first fulcrum point is a support means. Operably connected to the lever means is a cam follower means which has spaced adjacent thereto a first rotatable cam member and a second rotatable cam member. The first and second cam members rotate in unison and are operably connected to a reversible motor means which selectively drives the first and second cam members in a clockwise and counterclockwise direction. The first and second cam members along with the cam follower means are adapted to control the movement of the valve operating means with the lever means either positioned at the first fulcrum point or at the second fulcrum point.

Briefly, a preferred embodiment of the present invention operates in the following manner. When the valve operating means is located in the first position and is contacting a first contact switch indicating that the safety valve is open and fluid is freely flowing in the fluid system, the lever means is located at the first fulcrum point. The first cam member which includes a cam periphery defining a first cam segment engages the cam follower means to releasably retain the valve operating means in the first position. Upon rotation in a counterclockwise direction of the first and second cam members by the reversible motor means, the first cam member which also includes a second cam segment engages the cam follower means and the biasing means drives the operating valve means toward the second position. The safety valve slowly closes with minimum fluid pressure shock to the fluid system.

When the flow of fluid in the fluid system is under minimum pressure the lever means remains at the first fulcrum point throughout the entire closure of the safety valve. The biasing means has sufficient capability through its natural expansion characteristic to drive the valve operating means to the second position with the lever means located at the first fulcrum point. When the valve operating means reaches the second position, a second contact switch will be contacted by the valve operating means and the reversible motor means will be signalled to no longer cause the first and second cam members to rotate. The safety valve is now completely closed as the first and second cam members have rotated in unison and have cooperated with the cam follower means to move the valve operating means from the first position to the second position with substantial mechanical advantage.

When the flow of fluid in the fluid system is under high pressure, the biasing means is unable to drive the valve operating means to the second position. When the biasing means no longer is able to drive the valve operating means toward the second position because of the force of fluid in the fluid system against the safety valve, the force which drives the valve operating means to the second position is now provided by the second cam member. The second cam member which includes a cam periphery defining a first cam segment engages the cam follower means to move the lever means from the first fulcrum point to the second fulcrum point. The second cam member which further includes a second cam segment engages the cam follower means to move the valve operating means into the second position with the lever means located at the second fulcrum point. When the valve operating means moves to the second position, the second contact switch will be actuated by the valve operating means and the reversible motor means will be signalled to no longer cause the first and second cam members to rotate. The safety valve is now completely closed as the first and second cam members have rotated in unison and have cooperated with the cam follower means to move the valve operating means from the first position to the second position with substantial mechanical advantage.

During the closure of the safety valve under normal operating conditions with minimum pressure shock to the fluid system, the present invention maintains the ability to rapidly close the safety valve when the valve actuating mechanism senses an emergency condition. When the valve actuating mechanism senses such an emergency condition, the support means for the lever means will rotate in a counterclockwise direction thereby causing the lever to move from the first fulcrum point to a released position. Thereafter, the valve operating means will move from the first position or a position vertically above the first position to the second position and the safety valve will be closed. The present invention maintains the ability in an emergency condition to rapidly close the safety valve throughout the opening and closing of the safety valve when the fluid in the fluid system in under minimum pressure. However, when the fluid in the fluid system is under high pressure, the present invention maintains the rapid emergency closure feature except when the lever means is located at the second fulcrum point. But, the period of time is short when the lever means is located at the second fulcrum point, because movement of the lever means from the first fulcrum point to the second fulcrum point does not occur until near final closure of the safety valve when the biasing means no longer has the capability of driving the valve operating means toward the second position. When the fluid in the fluid system is under very high pressure the lever means will move from the first fulcrum point to the second fulcrum point sooner than when the fluid system is under ordinary high pressure. Finally, even when the lever means is at the second fulcrum point and an emergency condition occurs, the flow of fluid in the fluid system has been substantially slowed by closure of the safety valve and full closure may be accomplished quickly by completion of the closure of the safety valve as provided for in the present invention.

In the preferred embodiment, the present invention also allows for opening the safety valve while maintaining the capability of rapidly closing the safety valve during the procedure for opening the safety valve and when the safety valve is completely open. When the safety valve is closed, the valve operating means is located in the second position and the fluid does not flow through the fluid system. When the fluid in the fluid system is under low pressure, the lever means is located at the first fulcrum point and the safety valve has been closed with minimum pressure shock to the fluid system. Upon rotation in a clockwise direction of the first and second cam members by the reversible motor means, the second cam segment of the first cam member engages the cam follower means and causes the valve operating means to move from the second position to the first position with the lever means pivoting about the first fulcrum point. When the valve operating means reaches the first position the first contact switch will be contacted by the valve operating means and the reversible motor means will be signalled to no longer cause the first and second cam members to rotate. The safety valve is now completely open as the first and second cam members have rotated in unison and have cooperated with the cam follower means to move the valve operating means from the second position to the first position with substantial mechanical advantage.

When the flow of fluid in the fluid system is under high pressure and the safety valve has been closed with minimum pressure shock to the fluid system, the valve operating means is located at the second fulcrum point. Upon rotation in a clockwise direction of the first and second cam members by the reversible motor means, the lever means will move from the second fulcrum point to the first fulcrum point. Thereafter, the first cam member engages the cam follower means and causes the valve operating means to move from the second position to the first position with the lever means pivoting about the first fulcrum point. When the valve operating means reaches the first position the first contact switch will be contacted by the valve operating means and the reversible motor means will be signalled to no longer cause the first and second cam members to rotate. The safety valve is now completely open as the first and second cam members have rotated in unison and have cooperated with the cam follower means to move the valve operating means from the second position to the first position with substantial mechanical advantage.

BRIEF DESCRIPTION OF THE DRAWINGS

An exemplary embodiment of the invention summarized above is illustrated in the accompanying drawings in which:

FIG. 1 is a front view of a safety valve apparatus including a valve actuating mechanism embodying features of this invention and showing the safety valve being maintained in an open position;

FIG. 2 is an enlarged side view taken along the line 2—2 in FIG. 1, illustrating the first and second cam members and the cam follower member apparatus;

FIG. 3A is an enlarged front view taken along the line 3A—3A in FIG. 2, illustrating the first cam member and the cam follower member apparatus operably connected to the lever arm;

FIG. 3B is an enlarged front view taken along the line 3B—3B in FIG. 2, illustrating the second can member and associated second cam roller;

FIG. 6 is a partial front view illustrating the valve actuating mechanism under a normal condition with the safety valve completely closed and the valve operating rod in the second position;

FIG. 7 is a schematic view of the electrical circuitry of the present invention; and FIGS. 8 and 9 are enlarged perspective views of the latching assembly releasably supporting the lever arm.

DETAILED DESCRIPTION OF THE EXEMPLARY EMBODIMENT

Figure 4:
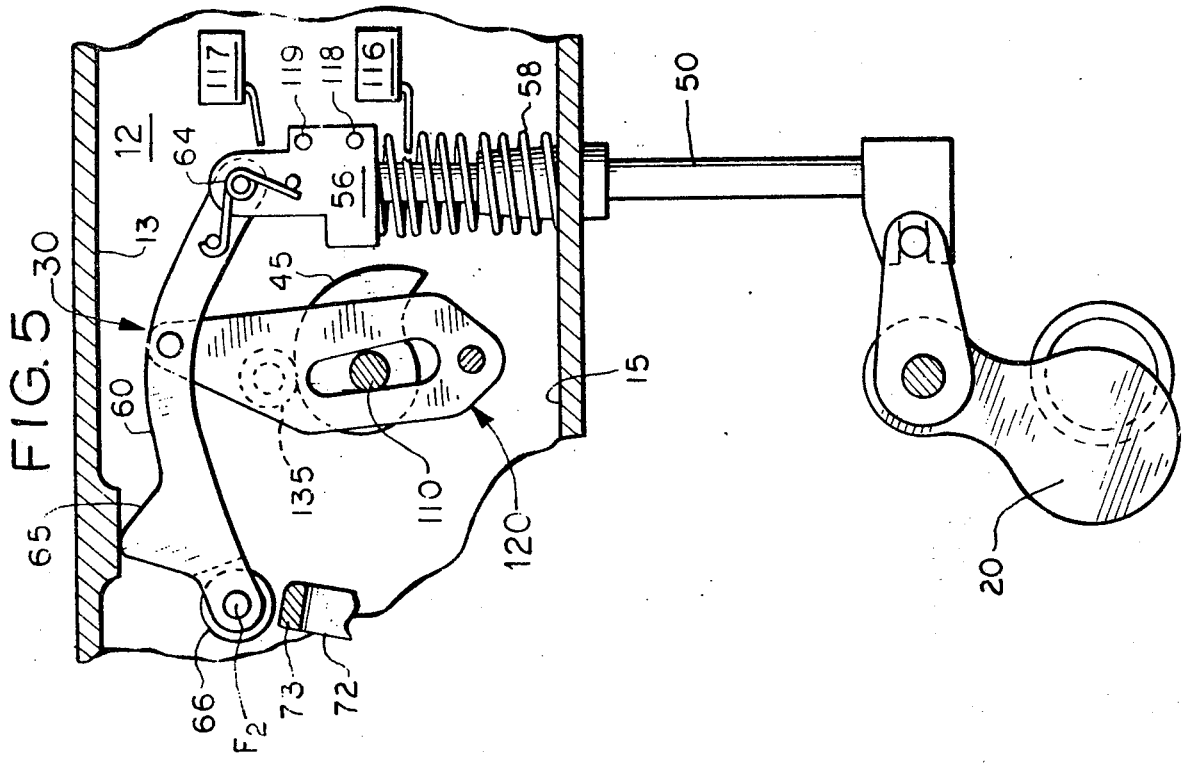
FIG. 4 is a partial front view illustrating the valve actuating mechanism under an emergency condition with the safety valve located in the closed position.

Briefly described with reference to FIG. 1, the invention provides a safety valve apparatus 10 having a safety valve 20 with an improved valve actuating mechanism 30. In accordance with the present invention, the valve actuating mechanism 30 includes a first cam member 40 and a second cam member 45 which are operably connected to the safety valve 20, and which are selectively rotatable through a complete 360 degree arc in both a counterclockwise and a clockwise direction. As explained further below, the valve actuating mechanism 30 including the first and second cam members 40 and 45 will thereby control the movement of the safety valve 20 under normal operating conditions, and permit rapid closure of the safety valve 20 in response to a signal indicating the existence of an emergency condition. Moreover, the valve actuating mechanism 30 provides a mechanism for opening and closing the safety valve 20 under a normal operating condition with minimum pressure shock to the fluid system. The present invention further maintains the capability for use of the valve actuating mechanism 30 to rapidly close the safety valve 20 in response to an emergency condition. This rapid closure feature such as the valve actuating mechanism described and claimed in U.S. Pat. No. 3,508,446 provides the valve actuating mechanism 30 to rapidly close the safety valve 20 in response to an emergency condition in the fluid system in which the safety valve apparatus 10 is employed.

Referring to FIG. 1 in more detail, the safety valve apparatus 10 includes a housing 12 containing the valve actuating mechanism 30 and a valve apparatus 14 containing the safety valve 20. The valve apparatus 14 includes a pipeline 16 through which the fluid to be controlled by the safety valve apparatus 10 will flow. Suitable bolts 18 and gasket material (not shown) join the housing 12 to an adapter plate 19 which is positioned between the housing 12 and the valve apparatus 14. The adapter plate 19 is joined to the valve apparatus 14 by suitable bolts 21.

As seen in FIG. 1, the safety valve 20 is preferably of the gate valve type, and is rotatably mounted adjacent the fluid pipeline 16 by a pivot pin 22. As is well-known to those skilled in the art, the gate valve 20 can therefore rotate about the pivot pin 22 from a retracted or open position within the valve apparatus 14, where the fluid pipeline 16 is unobstructed, to a closed position aligned with the pipeline 16, where the flow of fluid in the pipeline 16 is blocked by the safety valve 20. A suitable link 24 is connected to the pivot pin 22 to control the movement of the gate valve 20 between the above-described opened and closed positions.

As further seen in FIG. 1, the valve actuating mechanism 30, in addition to the first and second cam members 40 and 45, includes an elongated valve operating rod 50. The valve operating rod 50 extends downwardly from the housing 12 and has its lower end operably connected to a link 24. To accomplish this connection, the link 24 is preferably provided with a slide pin 26 and the lower end of the valve operating rod 50 is provided with a member 52 defining a slot 54. The slide pin 26 engages the member 52 within the slot 54 to form a pin and slot-type connection between the link 24 in the valve operating rod 50. By this arrangement, longitudinal movement of the valve operating rod 50 will be transferred to the link 24 by the above-described pin and slot connection and will cause the safety valve 20 to pivot about the pivot pin 22. In the illustrated embodiment, upward movement of the valve operating rod 50 as viewed in FIG. 1 will result in movement of the safety valve 20 toward its closed position in alignment with the pipeline 16. Conversely, any downward movement of the valve operating rod 50 will retract the gate valve 20 toward its open position with respect to the pipeline 16. A valve operating body 56 is connected to the upper end of the operating rod 50, and a compression spring 58 is placed between the housing 12 and the valve operating body 56, so that the valve operating rod 50 is spring-biased upwardly as viewed in FIG. 1. Accordingly, the compression spring 58 constantly biases safety valve 20 towards the closed position.

Figure 5:
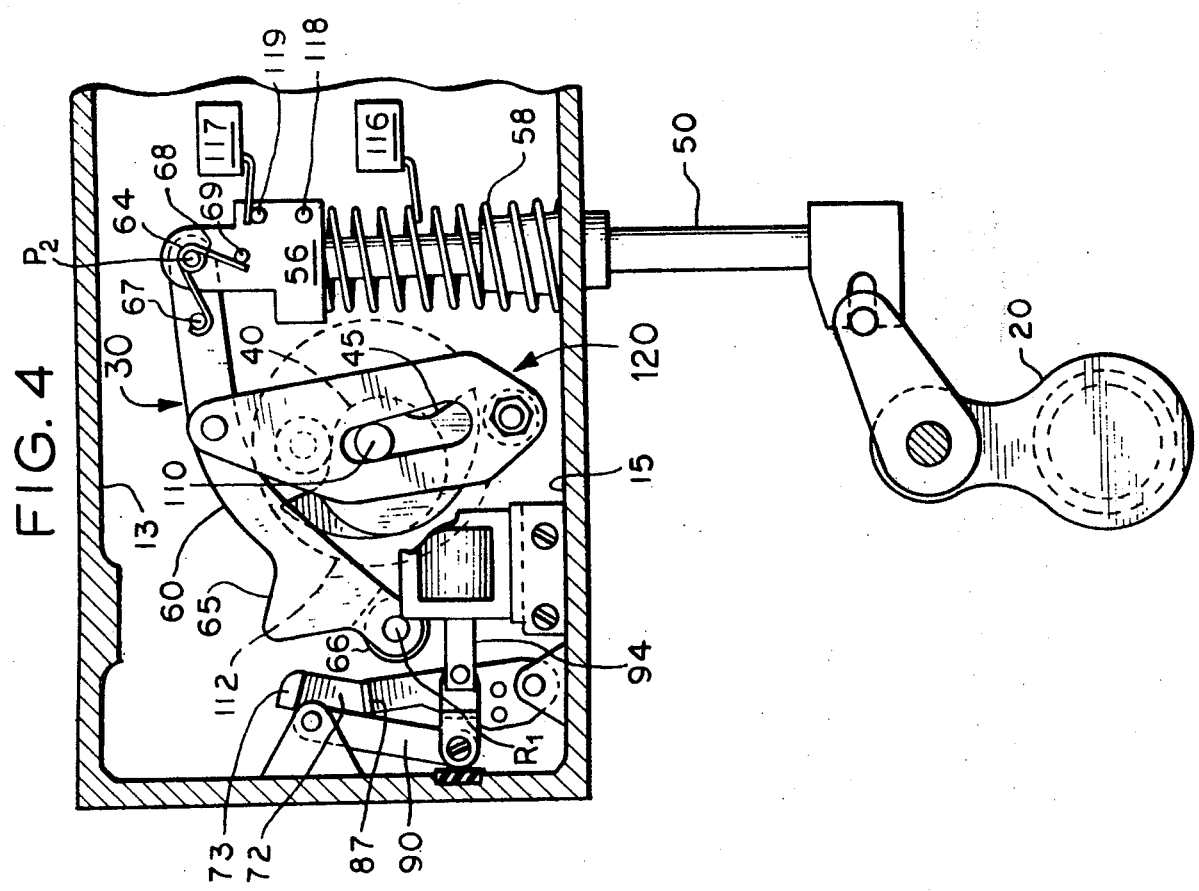
FIG. 5 is a partial front view illustrating the valve actuating mechanism under a normal condition with the safety valve in a partially closed position and the valve operating rod biased toward the second position.

When the safety valve 20 is open and the compression spring 58 is compressed as shown in FIG. 1, the valve operating rod 50 is located in a first position $P_1$. The compression spring 58 constantly biases the valve operating rod 50 located in the first position $P_1$ toward a second position $P_2$. As the valve actuating mechanism 30 closes the safety valve 20 with minimum pressure shock to the fluid system, the valve operating rod 50 is located between the first and second positions $P_1$ and $P_2$ and biases toward the second position $P_2$ by the compression spring 58. FIG. 5 shows the valve actuating mechanism in a partially closed state. As shown in FIG. 6, when the valve operating rod 50 is located in the second position $P_2$, the safety valve 20 is completely closed.

In order to control the longitudinal movement of the operating rod 50, and thus control the positioning of the safety valve 20, the valve actuating mechanism 30 further includes an arcuately shaped lever arm 60. The lever arm 60 is pivotably connected to the valve operating body 56 of the operating rod 50 by means of a suitable pivot pin 64. The pivot pin 64 thus defines a pivot point about which the lever arm 60 will rotate with respect to the valve operating rod 50 during the operation of the valve actuating mechanism 30.

The lever arm 60 in accordance with this invention includes a roller 66 at the end of the arm opposite the pivot pin 64. As explained further hereinafter, the roller 66 defines a first fulcrum point $F_1$ for the lever arm 60 which is transversely spaced from the pivot pin 64. It is apparent from FIG. 1 that if the lever arm 60 is secured or supported in a suitable manner at the first fulcrum point $F_1$, a force acting downwardly upon the lever arm 60 will pivot the lever arm 60 about the roller 66 located at the first fulcrum point $F_1$ and rotate the lever arm 60 in a clockwise direction. Such force will in turn transfer to to the valve operating rod 50 through the pivot pin 64 to counteract the upward biasing force of the compression spring 58. The force of the lever arm 60 will thus urge the safety valve 20 toward the open position illustrated in FIG. 1 in the presence of adequate support for the lever arm at the first fulcrum point $F_1$.

The lever arm 60 in accordance with the present invention is also capable of pivoting about the pivot pin 64 to swing the roller 66 from the first fulcrum point $F_1$ to a second fulcrum point $F_2$. As best shown in FIG. 5, the second fulcrum point $F_2$ is defined by the position of the roller 66 when the lever arm 60 is located on the upper wall 13 of the housing 12. The lever arm 60 has a raised portion 65 located adjacent the roller 66 which abuts the upper wall 13 of the housing 12. When the lever arm 60 is located at the second fulcrum point $F_2$, the lever arm 60 pivots about the second fulcrum point $F_2$ with the valve operating rod 50 vertically rising or falling with respect to the stationary position of the roller 66. An upward force on the lever arm 60 when located at the second fulcrum point $F_2$ will urge the safety valve 20 toward the closed position as illustrated in FIG. 5.

The valve actuating mechanism 30 of the present invention maintains the capability of rapid closure of the safety valve 20 under an emergency condition. An example of a valve actuating mechanism having this capability is described and claimed in U.S. Pat. No. 3,508,446. A brief description of a latching assembly providing the emergency closure feature in the present invention is now provided.

The valve actuating mechanism 30 and the safety valve 20 are arranged so that the roller 66 of the lever arm 60 can swing from the first fulcrum point $F_1$ to a released position $R_1$ which is shown in FIG. 4. When the lever arm 60 is in the released position $R_1$, the valve actuating mechanism 30 has responded to an emergency condition. When the roller 66 of the lever arm 60 moves from the first fulcrum point $F_1$ to the released position $R_1$, the roller 66 of the lever arm 60 pivots about the pivot pin 64 and moves counterclockwise in response to longitudinal movement of the valve operating rod 50. The arcuate shape of the lever arm 60 permits the roller 66 to move to this released position $R_1$ without any interference between the lever arm 60 and the first and second cam members 40 and 45. A set of torsion springs 68 is mounted about the pivot pin 64 and engaged between a pair of anchor pins 67 and 69 on the lever arm 60 and the valve operating body 56, respectively, as clearly shown in FIG. 4, to constantly bias the roller 66 of the lever arm 60 toward the second fulcrum point $F_2$.

Now referring to FIGS. 1, 8 and 9, a latching assembly 70 is positioned with the housing 12 adjacent to the roller 66 of the lever arm 60. The latching assembly 70 includes a support stool 72 having a contact surface 73 engagable with the roller 66 of the lever arm 60 to releasably retain the roller 66 at the first fulcrum point $F_1$ as shown in FIG. 8. A first pin 74 pivotably connects the support stool 72 to a member 80 positioned at a bottom wall 15. The first pin 74 has a first biasing spring 75 which constantly biases the support stool 72 in a clockwise direction. The member 80 includes a first arm 77 and a second arm (not shown) which are connected by the first pin 74. The member 80 further includes a second pin 79 which connects the first arm 77 and second arm (not shown) and is positioned adjacent to the first pin 74. The purpose of the second pin 79 is to restrain the support stool 72 after rotating through a small arc in a clockwise direction urged by the first biasing spring 75. The member 80 is pivotably connected to the bottom wall 15 by a third pin 81 which connects bosses 83 rigidly connected to the bottom wall 15. The third pin 81 has a second biasing spring 82 which constantly biases the member 80 in a counterclockwise direction. Being mounted on the third pin 81, the second biasing spring 82 is connected between the bottom wall 15 and a fourth pin 85 which is positioned between the first pin 74 and the third pin 81. Since the member 80 and the second pin 79 are constantly biased in a counterclockwise direction the support stool 72 is restrained after rotating through a small arc.

The first arm 77 of the member 80 has an extension 86 which extends diagonally from the end opposite the pivot connection of the third pin 81 with the first arm 77. The extension 86 has a projection 87 which abuts a link 90. The projection 87 operably connects the member 80 with the link 90 to determine the position of the support stool 72. The projection 87 of the extension 86 is in contact with the link 90 at all times during the operation of the valve actuating mechanism 30. The link 90 is pivotably connected to a pair of bosses 92 by a fifth pin 91 connecting the bosses 92. As seen in FIG. 1, the bosses 92 are rigidly connected to a wall 17 and provide a pivot point for the link 90 which is connected at the other end to a rod 94 of a solenoid 100. When the solenoid 100 is supplied with energy from a suitable power source, the rod 94 will be drawn toward the solenoid 100 and when the solenoid 100 is not supplied with energy, the rod 94 will no longer be drawn toward the solenoid. Thus, when the solenoid 100 is energized, the latching assembly 70 is capable of supporting the roller 66, but when the solenoid 100 is not energized, the latching assembly 70 is not capable of supporting the roller 66 and the safety valve 20 cannot be opened.

As seen in FIG. 8, when the solenoid 100 is energized by a power source (not shown), the rod 94 of the solenoid 100 is drawn toward the solenoid 100 and correspondingly, the link 90 pivots in a counterclockwise direction about the fifth pin 91. The force of movement of the link 90 is sufficient to overcome the biasing force of the second biasing spring 82 of the member 80 which is being urged in a counterclockwise direction. The extension 87 of the member 80 is driven by the link 90 in a clockwise direction and since the support stool 72 is operably connected to the member 80, the support stool 72 advances and is able to support the roller 66 of the lever arm 60. The valve actuating mechanism 30 now has the capability of opening the safety valve 20, since the roller 66 of the lever arm 60 may pivot about the first fulcrum point $F_1$.

As seen in FIG. 9, when the solenoid 100 is no longer energized by the power source (not shown), the rod 94 of the solenoid 100 is no longer drawn toward the solenoid 100. The counterclockwise force of the biasing spring 81 of the member 80 is now sufficient to drive the member 80 in a counterclockwise direction and the support stool 72 being operably connected to the member 80 is no longer able to support the roller 66 of the lever arm 60. The valve actuating mechanism 30 does not have the capability of opening the safety valve 20, since the roller 66 of the lever arm 60 is unable to pivot about the first fulcrum point $F_1$.

Referring now to FIGS. 1 and 2, within the housing 12 the first cam member 40 is fixed to the inside end of a rotatable cam shaft 110. The second cam member 45 is also fixed on the inside end of the cam shaft 110 adjacent to the first cam member 40. In the preferred arrangement, the first and second cam members 40 and 45 are disposed in substantially vertical alignment with the lever arm 60. Furthermore, the first and second cam members 40 and 45 are substantially identical in shape and are positioned on the cam shaft 110 in opposed directions. The first and second cam members 40 and 45 include projecting lobes 42 and 47 respectively. The position of the lobe 42 on the first cam member 40 at all times during the rotation of the cam members by the cam shaft 110 is substantially 180-degrees out of phase with respect to the lobe 47 on the second cam member 45. The first and second cam members 40 and 45 rotate about the cam shaft 110 in unison to operably control the movement of the safety valve 20 to open or close with minimum pressure shock to the fluid system.

Referring now to FIG. 3A, it will be seen that the first cam member 40 is a peripheral cam, and includes the projecting lobe 42 which defines a first cam segment $r$. The first cam member 40 also includes a recess 44 in peripheral communication with the lobe 42 by a steep cam slope. The recess 44 thereby defines a quick-action cam fall segment $f$ directly following the first cam segment $r$ on the contour of the first cam member 40. Finally, the 360-degree contour of the first cam member 40 is completed by a second cam segment $l$. The second cam segment $l$ preferably has a profile so that the first cam member 40 moves a follower from the cam fall segment $f$ to the first cam segment $r$ with substantially uniform movement.

Now referring to FIG. 3B, the second cam member 45 is a peripheral cam and includes the projecting lobe 47 which defines a first cam segment $rr$. The second cam member 45 also includes a recess 48 in peripheral communication with the lobe 47 by a steep cam slope. The recess 48 thereby defines a quick-action cam fall segment $ff$ directly following the first cam segment $rr$ on the contour of the second cam member 45. Finally, a 360-degree contour of the second cam member 45 is completed by a second cam segment $ll$. The second cam segment $ll$ preferably has a profile so that the second cam member 45 moves a follower from the cam fall segment $ff$ to the first cam segment $rr$ with substantially uniform movement.

The construction of the valve actuating mechanism 30 in accordance with this invention is completed by the provision of a cam follower member, generally indicated by the reference numeral 120. As seen best in FIGS. 1 and 2, the cam follower member 120 in this embodiment comprises a pair of spaced plates 122 and 123 pivotably connected by the pin 124 to the lever arm 60 at a point intermediate the ends of the lever arm 60. The pin 124 thereby defines an actuating point on the lever arm 60 which is spaced between the end of the lever arm 60 where the first fulcrum point $F_1$ and second fulcrum point $F_2$ are located and the other end of the lever arm 60 where the first position $P_1$ and the second position $P_2$ are located. The actuating point located at the pin 124 acts as a pivot point when the valve actuating mechanism 30 responds to an emergency condition and the lever arm 60 moves from the first fulcrum point $F_1$ to the released position $R_1$ and the valve operating rod 50 moves from the first position $P_1$ to the second position $P_2$.

Each of the plates 122 and 123 defines a slot 126 which fits loosely over the cam shaft 110 so that the cam follower member 120 is free to move vertically or transversely within the housing 12. The cam follower member 120 is completed by mounting a first cam roller 130 on a pin 128 connected between the lower ends of the spaced plates 122 and 123. The cam follower member 120 also has a cam roller 135 on a pin 136 connected to the cam follower member 120 at the upper end of the space plate 123. As shown in FIG. 2, the first cam roller 130 and the second cam roller 135 engage with the periphery of the first cam member 40 and the second cam member 45, respectively, and cause the cam follower member 120 to move in response to the rotation of the first and second cam members 40 and 45.

In accordance with the present invention, when the safety valve 20 is open and the valve operating rod 50 is in the first position $P_1$, the first cam segment $r$ of the first cam member 40 engages the first cam roller 130 and the second cam member 45 is adjacent to the recess 48. When the first and second cam members 40 and 45 begin to rotate in a counterclockwise direction by means of a motor which is more fully described hereinafter, the first cam segment $r$ of the first cam member 40 will disengage from the first cam roller 130 and now the second cam segment $l$ will engage the first cam roller 130. Simultaneously, the second cam member 45 will move adjacent to the second cam roller 135 along the second cam segment $ll$. When the flow of fluid in the pipeline 16 is under high pressure and the compression spring 58 no longer drives the valve operating rod 50 toward the second position $P_2$, the second cam segment 45 will engage the second cam roller 135 along the second cam segment $ll$. Simultaneously, the first cam member 40 will disengage from the first cam roller 130 along the second cam segment $l$. When the safety valve 20 is closed and the valve operating rod 50 is in the second position $P_2$, the first cam segment $rr$ of the second cam member 45 engages the second cam roller 135 while the first cam member 40 is adjacent to the recess 44.

As shown in FIG. 1, the cam shaft 110 is rotatably connected to a motor 112 which is any reversible drive motor which would be well-known to the ordinary person skilled in the art. In this particular embodiment, a model G motor (Brevel Sample No. 55G-9285) manufactured by Brevel Motors Division of Ingraham Industries has been utilized. It should be recognized that any conventional reversible drive motor could be substituted for this particular motor used in this embodiment. The motor 112 rotates the cam shaft 110 and in turn operably rotates the rigidly attached first and second cam members 40 and 45 during the operation of the valve actuating mechanism 30. The motor 112 will operably rotate the first and second cam members 40 and 45 either in a counterclockwise or clockwise direction depending upon whether the safety valve 20 is desired to be closed or open.

Referring now to FIG. 7, the motor 112 is incorporated into electrical circuitry 111 which includes a power source 113, a pair of switches 114 and 115, a pair of contact switches 116 and 117, and a pair of pins 118 and 119. Supplying electricity to the electrical circuitry 111 is the power source 113. The switches 114 and 115 are adapted to control the direction of rotation of the motor 112. The contact switches 116 and 117 are placed in the electrical circuitry 111 to stop the motor 112 from continuing to rotate the cam shaft 110 when the safety valve 20 has been completely opened or closed. As best shown in FIG. 4, the pins 118 and 119 are rigidly connected to the valve operating body 56 and when the pin 118 engages the contact switch 116 or the pin 119 engages the contact switch 117, the electrical circuitry 111 is rendered open and the motor 112 no longer rotates the cam shaft 110.

Referring now to FIG. 7, the electrical circuitry 111 operates in the following manner. When the switch 114 is closed which causes the motor 112 to rotate the cam shaft 110 in a clockwise direction, the valve actuating mechanism 30 opens the safety valve 20. When the pin 118 on the valve operating body 56 engages the contact switch 116, the electrical circuitry 111 is rendered open and the motor 112 no longer rotates the cam shaft 110. When the safety valve 20 is closed under normal operating conditions, the switch 115 is closed and the power source 113 supplies electricity to the motor 112 which causes the cam shaft 110 to rotate in a counterclockwise direction, the valve actuating mechanism 30 closes the safety valve 20 with minimum pressure shock to the fluid system. When the pin 119 on the valve operating body 56 engages the contact switch 117, the electrical circuitry 111 is rendered open and the motor 112 no longer rotates the cam shaft 110. The valve actuating mechanism 30 has completed a cycle of opening and closing the safety valve 20 with minimum pressure shock to the fluid system.

As shown in FIG. 7, there is also included an electrical circuitry 93 which includes the solenoid 100 and a switch 95. When the switch 95 responds to an emergency condition and opens the solenoid 100 will no longer be supplied with electricity from the power source 113. The valve actuating mechanism 30 will be in an emergency closure condition as seen in FIG. 4. When the switch 95 is closed, the solenoid 100 will become energised by the power source 113, and allow the latching assembly 70 once again to support the lever arm 60 and particularly the roller 66 on the support stool 72. Under normal operating conditions, the valve actuating mechanisms 30 of the present invention maintains the safety valve 20 in an open position, as shown in FIG. 1, so that the flow of fluid in the pipeline 16 is unrestricted. In normal operating conditions, the solenoid 100 is energized and the latch assembly 70 releasably supports the roller 66 on the lever arm 60. While the latch assembly 70 supports the roller 66 on the level arm 60 at the first fulcrum point $F_1$, the lever arm 60 can pivot about the first fulcrum point in response to rotation of the first and second cam members 40 and 45.

The present invention enables a valve actuating mechanism 30 to open and close the safety valve 20 with minimum pressure shock in the fluid system. The preferred embodiment of the present invention operates in the following manner. As seen in FIG. 1 when the valve operating rod 50 is located in the first position $P_1$ indicating that the safety valve 20 is open and the fluid is freely flowing in the pipeline 16, the roller 66 of the lever arm 60 is located at the first fulcrum point $F_1$. When it is desired to close the safety valve 20 with minimum pressure shock to the fluid in the pipeline 16, the switch 115 within the electrical circuitry 111 is closed and the motor 112 rotates the cam shaft 110 in a counterclockwise direction. Rotation of the cam shaft 110 will in turn cause the first cam member 40 to rotate and the first cam rise segment $r$ on the first cam member 40 will disengage from the first cam roller 130. The second cam rise segment $l$ on the first cam member 40 will engage the first cam roller 130 and the cam follower member 120 will begin to rise vertically. The compression spring 58 now drives the valve operating rod 50 toward the second position $P_1$. with the lever arm 60 pivoting about the roller 66 located at the first fulcrum point.

When the flow of fluid in the pipeline 16 is under minimum pressure, the roller 66 of the lever arm 60 remains at the first fulcrum point $F_1$ throughout the entire closure of the safety valve 20. In this particular embodiment, minimum pressure of fluid in the pipeline 16 may be defined as a differential pressure of 200 pounds per square inch or less comparing the fluid pressure of fluid on one side of the safety valve 20 with the fluid pressure of fluid on the other side of the safety valve 20. The compression spring 58 has sufficient capability through its natural expansion characteristic to drive the valve operating rod 50 to the second position $P_1$. When the valve operating rod 50 reaches the second position $P_1$, the lever arm 60 is still at the first fulcrum point $F_1$ and the safety valve 20 is closed. The pin 118 now engages the contact switch 116 which opens the electrical circuitry 111 and the motor 112 no longer rotates the cam shaft 110 in a counterclockwise direction.

When the flow of fluid in the pipeline 16 is under high pressure, the compression spring 58 does not have the capability of driving the valve operating rod 50 completely to the second position $P_1$. In this particular embodiment, high differential fluid pressure in the pipeline 16 may be defined as a differential pressure of 200 to 1,000 pounds per square inch. The point at which the compression spring 58 no longer drives the value operating rod 50 toward the second position $P_1$ is determined by the magnitude of the high differential pressure in the pipeline 16 against the safety valve 20. In this particular embodiment, when the differential pressure of fluid in the pipeline 16 was about 1,000 pounds per square inch, the cam shaft 110 had rotated approximately 75 percent toward the closed position of the safety valve 20. When the compression spring 58 is no longer able to drive the safety valve 20 closed on account of the force of fluid pressure against the safety valve 20, the second cam member 45 now drives the valve operating rod 50 to the second position. The second cam segment $ll$ of the second cam member 45 engages the second cam roller 135 of the cam follower member 120 to move lever arm 60 from the first fulcrum point to the second fulcrum point. As seen more clearly in FIG. 5 where the raised portion 65 of the lever arm 60 is located at the second fulcrum point $F_2$, now contacts the wall 13 of the housing 12. Now the raised portion 65 of the lever arm 60 pivots about the second fulcrum point $F_2$ to complete the closure of the safety valve 20. The second cam segment $ll$ on the second cam member 45 is now engaged with the second cam roller 135 to drive the cam follower member 120 and the valve operating rod 50 will move into the second position $P_2$. Now, the safety valve 20 will be completely closed as seen in FIG. 6. When the valve operating rod 50 moves to the second position $P_2$, the pin 119 on the operating body 56 will engage the contact switch 117 which opens the electrical circuitry 111 and the motor 112 will no longer rotate the cam shaft 110 in a counterclockwise direction. The safety valve 20 is now completely closed as the first and second cam members 40 and 45 have rotated in unison and cooperated with the cam follower member 120 to move the valve operating rod 50 from the first position $P_1$ to the second position $P_2$ with substantial mechanical advantage.

During the closure of the safety valve 20 under normal conditions with minimum pressure shock in the pipeline 16 the present invention maintains the ability to rapidly close the safety valve 20 when the valve actuating mechanism 30 responds to an emergency condition. When an emergency condition occurs, the support stool 72 of the latching assembly 70 will rapidly rotate in a counterclockwise direction. The roller 66 of the lever arm 60 will no longer be supported and will move to the released position. This movement translates to the valve operating rod 50 which moves from the first position $P_1$ or a position located between the first and second positions $P_1$ and $P_2$ and there after to the second position $P_2$. The safety valve 20 has now been rapidly closed under an emergency condition.

The present invention maintains the capability of the valve actuating mechanism 30 to rapidly close the safety valve 20 throughout the opening and closing of the safety valve 20 when the fluid in the pipeline 16 is under minimum pressure. However, when the fluid in the pipeline 16 is under high pressure, the present invention maintains the rapid closure feature except when the raised portion 65 of the lever arm 60 is located at the second fulcrum point $F_2$. As shown in FIG. 4, when the raised portion 65 of the lever arm 60 is located at the second fulcrum point $F_2$, and an emergency condition occurs, the safety valve 20 will continue toward the closed position. It should be recognized that the period of time is short when the raised portion 65 of the lever arm 60 is located at the second fulcrum point $F_2$ during the closure of the safety valve 20 with minimum pressure shock to the fluid in the pipeline 16. The movement of the lever arm 60 from the first fulcrum point $F_1$ to the second fulcrum point $F_2$ does not occur until the safety valve 20 has been nearly closed and the compression spring 58 no longer has the capability of forcing the valve operating rod 50 toward the second position $P_2$. When the fluid in the pipeline 16 is under high pressure, the lever arm 60 will move from the first fulcrum point $F_1$ to the second fulcrum point $F_2$ sooner than when the fluid in the pipeline 16 is under a lesser magnitude of pressure. Further, even when the lever arm 60 is at the second fulcrum point $F_2$ and an emergency condition occurs, the flow of fluid in the pipeline 16 has been substantially slowed by closure of the safety valve 20 and full closure may be accomplished quickly by completion of the closure of the safety valve 20 as provided for in the present invention.

The present invention also allows for opening the safety valve 20 while maintaining the capability of rapidly closing the safety valve 20 during the procedure for opening the safety valve 20 and when the safety valve 20 is completely open. As seen in FIG. 6, when the safety valve 20 is closed, the valve operating rod 50 is located in the second position $P_2$ and the fluid does not flow in the pipeline 16. When the fluid in the pipeline 16 is under low pressure, the lever arm 60 is located at the first fulcrum point $F_1$ after closure of the safety valve 20 with minimum pressure shock to the pipeline 16. Upon closure of the switch 115 in the electrical circuitry 111, the motor 112 is energized and the cam shaft 110 rotates in a clockwise direction. The first and second cam members 40 and 45 will engage and drive the cam follower member 120 vertically downward. When the motor 112 operably rotates the first and second cam members 40 and 45 in a clockwise direction, the second cam segment $l$ on the first cam member 40 engages the cam roller 130 on the cam follower member 120 and the valve operating rod 50 moves from the second position $P_2$ to the first position $P_1$ with the roller 66 of the lever arm 60 pivoting about the first fulcrum point $F_1$. When the valve operating rod 50 reaches the first position $P_1$, the safety valve 20 will be opened and the pin 118 on the valve operating body 56 will engage the contact switch 116 and the electrical circuitry 111 will open. The motor 112 will no longer rotate the cam shaft 110 in a clockwise direction.

When the flow of fluid in the pipeline 116 is under high pressure and the safety valve 20 is open, the raised portion of the lever arm 60 is located at the second fulcrum point $F_2$ after closure of the safety valve 20 with minimum pressure shock to the pipeline 16. Upon closure of the switch 115 in the electrical circuitry 111, the motor 112 is energized and rotates cam shaft 110 in a clockwise direction. The first and second cam members 40 and 45 will engage and drive the cam follower member vertically downward and the lever arm 60 will move from the second fulcrum point $F_2$ to the first fulcrum point $F_1$. Thereafter, the second cam segment $l$ on the first cam member 40 will engage the cam roller 130 on the cam follower member 120 and the valve operating rod 50 moves from the second position $P_2$ to the first position $P_1$ with the roller 66 of the lever arm 60 pivoting about the first fulcrum point $F_1$. When the valve operating rod 50 reaches the first position $P_1$, the safety valve 20 will be opened and the pin 118 on the valve operating body 56 will engage the contact switch 116 and electrical circuitry 111 will open. The motor 112 will no longer rotate the cam shaft 110 in a clockwise direction.

It should be understood that various modifications and preferred embodiments of this invention as discussed herein can be made without departing from the spirit and scope of the invention.

What is claimed is:

1. A valve actuating mechanism comprising in combination:

valve operating means movable between a first position and a second position, biasing means urging the valve operating means toward the second position, lever means operably connected to the valve operating means and movable between a first fulcrum point and a second fulcrum point, support means to releasably support the lever means at the first fulcrum point, cam follower means operably connected to the lever means, first rotatable cam member spaced adjacent to the cam follower means, second rotatable cam member spaced adjacent to the cam follower means and arranged for rotation with the first cam member, each of the cam members having a configuration which cooperates with the cam follower means to permit the biasing means to move the valve operating means rapidly toward the second position with the support means releasing the lever means.

the first cam member including a cam periphery defining a first cam segment adapted to engage the cam follower means to releasably retain the valve operating means in the first position with the lever means supported at the first fulcrum point; the first cam member further including on the cam periphery a second cam segment adapted to engage the cam follower means to allow the valve operating means to move from the first position toward the second position with the lever means supported at the first fulcrum point;

the second cam member including a cam periphery having a first cam segment and a second cam segment, the second cam member engages the cam follower means to cause the lever means to move from the first fulcrum point to the second fulcrum point, and causes the valve operating means to move into the second position with the lever means at the second fulcrum point, whereby the first and second cam members rotate in unison and cooperate with the cam follower means to move the valve operating means from the first position to the second position with substantial mechanical advantage.

2. A valve actuating mechanism in accordance with claim 1 wherein the first and second cam members rotate in one direction to move the valve operating means from the first position to the second position, and further wherein the first and second cam members rotate in a reverse direction to move the valve operating means from the second position to the first position, whereby the second cam segment of the first cam member engages the cam follower means and moves the lever means from the second fulcrum point to the first fulcrum point, and thereafter moves the valve operating means from the second position to the first position with substantial mechanical advantage.

3. A valve actuating mechanism in accordance with claim 2 wherein the first and second cam members have substantially identical configurations and are mounted in opposed directions on a common rotatable shaft means.

4. A valve actuating mechanism in accordance with claim 3 wherein the cam follower means comprises a first cam follower engagable with the periphery of the first cam member and a second cam follower engagable with the periphery of the second cam member, and further wherein the valve actuating mechanism includes a plate means joining the first and second cam followers to the lever means.

5. A valve actuating mechanism in accordance with claim 4 including a reversible motor means operably connected to the first and second cam members to selectively drive the cam members in a clockwise and counterclockwise direction.

6. A valve actuating mechanism for opening and closing a valve in a high pressure fluid line with minimum fluid pressure shock, comprising:
   valve operating means movable between an open position and a closed position,
   biasing means urging the operating means toward the closed position,
   lever means operably connected to the valve operating means and movable between a first fulcrum point and a second fulcrum point,
   support means releasably supporting the lever means at the first fulcrum point,
   cam follower means operably connected to the lever means,
   first cam member and a second cam member each spaced adjacent the cam follower means, each of the cam members having a configuration which cooperates with the cam follower means to permit the biasing means to move the valve operating means rapidly toward the second position with the support means releasing the lever means;
   the first cam member including a cam periphery having a first cam segment adapted to engage the cam follower means to releasably retain the valve operating means in the first position with the lever means supported at the first fulcrum point; the first cam member further including on the cam periphery a second cam segment adapted to engage the cam follower means to allow the valve operating means to move from the first position toward the second position with the lever means supported at the first fulcrum point;
   the second cam member including a cam periphery having a first cam segment and a second cam segment, the second cam member engages the cam follower means to cause the lever means to move from the first fulcrum point to the second fulcrum point when the line pressure on the valve precludes further movement of the valve operating means by the biasing means, and the second cam member further causes the valve operating means to move into the second position with the lever means at the second fulcrum point,
   whereby the first and second cam members rotate in unison and cooperate with the cam follower means to move the valve operating means from the first position to the second position and close the valve in the high pressure line with minimum fluid pressure shock to the fluid system.

* * * * *

UNITED STATES PATENT AND TRADEMARK OFFICE
CERTIFICATE OF CORRECTION

PATENT NO. : 3,987,679
DATED : October 26, 1976
INVENTOR(S) : JAMES A. CONDON and G. BRUCE BRENNEMAN It is certified that error appears in the above-identified patent and that said Letters Patent are hereby corrected as shown below:

Column 2, line 66, "actuated" should read -- contacted --.

Column 3, line 23, "in" should read -- is --.

Column 4, line 44, "can" should read -- cam --.

Column 11, line 13, "energised" should read -- energized --;
    column 11, line 24, "level" should read -- lever --;
    column 11, line 49, after "$P_1$" cancel "."

Column 12, line 11, "value" should read -- valve --.

In Claim 1: at column 14, line 40, after "lever means", cancel
    "."; at column 14, line 45, ";" should read -- , --.

In Claim 6, at column 16, line 14, ";" should read -- , --.

Signed and Sealed this

Eleventh Day of January 1977

[SEAL]

Attest:

RUTH C. MASON
Attesting Officer

C. MARSHALL DANN
Commissioner of Patents and Trademarks